United States Patent [19]

Edgar et al.

[11] Patent Number: 5,509,086

[45] Date of Patent: Apr. 16, 1996

[54] AUTOMATIC CROSS COLOR ELIMINATION

[75] Inventors: Albert D. Edgar, Austin, Tex.; James M. Kasson, Menlo Park, Calif.

[73] Assignee: International Business Machines Corporation, Armonk, N.Y.

[21] Appl. No.: 173,798

[22] Filed: Dec. 23, 1993

[51] Int. Cl.$^6$ .................................................. G06K 9/00
[52] U.S. Cl. ............................................ 382/167; 382/191
[58] Field of Search .................................. 382/1, 17, 100, 382/162, 167, 191; 358/518, 515, 527; 355/35, 77; 348/64, 263

[56] References Cited

U.S. PATENT DOCUMENTS

| | | | |
|---|---|---|---|
| 4,630,104 | 12/1986 | Nakagaki et al. | 358/36 |
| 4,774,565 | 9/1988 | Freeman | 358/41 |
| 4,803,548 | 2/1989 | Kirk | 358/36 |
| 4,956,769 | 9/1990 | Smith | 364/200 |
| 5,001,553 | 3/1991 | Matsuo et al. | 358/31 |
| 5,019,895 | 5/1991 | Yamamoto et al. | 358/36 |
| 5,027,194 | 6/1991 | Scheffler | 358/36 |
| 5,043,802 | 8/1991 | Tarumizu et al. | 358/36 |
| 5,045,933 | 9/1991 | Tatsumi | 358/518 |
| 5,050,213 | 9/1991 | Shear | 380/25 |
| 5,149,960 | 9/1992 | Dunne et al. | 250/226 |
| 5,157,506 | 10/1992 | Hannah | 358/518 |
| 5,212,546 | 5/1993 | Arazi et al. | 358/518 |
| 5,255,083 | 10/1993 | Capitant et al. | 358/527 |
| 5,335,097 | 8/1994 | Murakami | 358/518 |
| 5,363,318 | 11/1994 | McCauley | 358/512 |

OTHER PUBLICATIONS

IBM Technical Disclosure Bulletin vol. 31, No. 4 Sep. 1988, Method to Provide User ID/Group ID Translation In The IBM RT/PC Networks.

IBM Technical Disclosure Bulletin, vol. 32, No. 8B, Jan. 1990, Userid Security For Applications In Multi–Node VMS.

Primary Examiner—Leo Boudreau
Assistant Examiner—Phuoc Tran
Attorney, Agent, or Firm—Jeffrey S. LaBaw

[57] ABSTRACT

Color crosstalk is determined between layers of an image storage medium based on the cross correlations and autocorrelations of noise in the grain pattern in each layer of the image storage medium. Rather than relying on prior measurement under laboratory conditions, the invention scans the storage medium in a plurality of spectral bands to derive the record stored in each of the dye layers. A computer derives the autocorrelations and the crosscorrelations of a group of pixels between the plurality of color records of the scanned images each of which corresponds to one of the spectral bands. The invention is based on the observation that as each dye layer is deposited separately in the film, one would expect that the "noise" from the grain boundaries in one layer to be independent from the "noise" due to the grain boundaries in other layers. If there is correlation in noise between separate color scans, it is because the scanner is measuring the grain boundaries in more than one layer in the color scans.

26 Claims, 13 Drawing Sheets

AUTOMATIC CROSS COLOR ELIMINATION

This invention relates generally to image enhancement. More particularly, it relates to a system and method for correcting for color interactions between an image storage media and the spectral response of an image scanner which scans the image storage media.

Color image reproduction from film suffers from complex color interactions between the film and the spectral response of the chemical, biological or electronic imager. Color calibration is a major concern between different films, scanners and printers. Each combination has different characteristics and will yield different results if uncompensated. Solving these problems is a prerequisite to the conversion of image making from a film based industry to a computer based industry. However, there are so many interacting variables that calibration presents very daunting mathematical problems.

There are four major interactions affecting color image reproduction. First, the spectrum of the object interacts with the film spectral sensitivity. Second, the absorption spectra of the dyes in the film change with aging. Third, the spectra of the dyes in the film interact with the scanner spectral sensitivity. Fourth, the dyes in the print interact with ambient lighting and the human eye.

Photographic film uses three interrelated dye records to record an image: cyan, magenta and yellow which correspond respectively to the red, green and blue information in the scene being photographed. Like the human eye, the dye layers absorb light preferentially in different regions of the spectrum. However, the dye layers in each film absorb light in the red, green or blue regions differently than from other films and especially than the biological sensor of the human eye. Further, the cyan, magenta and yellow dyes in the film not only absorb light in the desired red, green or blue bands in the spectrum, but each dye also absorbs in other bands in addition to the desired band.

As the film ages, each of the records in the dye layers can change color and density, either through chemical aging or light aging. With time, the contrast of the recorded image goes down and goes down faster in the highlight regions than in the shadow regions of the image, and the dyes change color so the interactions between the dyes and scanner change. Thus, as the film ages, the image stored in film becomes progressively different and degraded from that stored when the film was new.

A scanner is used to measure the optical modulation of each dye in the film to estimate the red, green and blue content of the original scene. A scanner designed to pick up frequencies in a reasonably wide range of frequencies within the red, green or blue bands will also pick up some color crosstalk from other dye layers. While the scanner can be designed to have a monochromatic sensitivity at the peak absorptions of the three dyes, e.g., a laser scanner, the narrower the spectral response of each color channel, the less the system efficiency or sensitivity. Most scanners use a band of frequencies for each color to improve their sensitivity, however, these wider spectral responses result in color crosstalk. If uncompensated, the "green" in the scanned image will be the result of some blue or red frequencies in the original image. Each combination of film and scanner will give different results. This problem is exacerbated, as mentioned above, by the fact that each dye layer absorbs light outside the desired band. Not only do each combination of film and scanner give a unique effect, but also the effect will also change as the film ages. Typically, the prior art compensated for color crosstalk by tables of laboratory measurements of different film and scanner combinations. A technician will enter in the appropriate data based on the film being scanned and the scanner being used. In addition to the requirement for highly skilled technician with knowledge of both film and scanner characteristics, the prior art does not compensate for the effects of age.

Depending on the spectra of light in ambient lighting, the dyes in a print can appear quite different. A classical problem also exists at the initial capture of the image on the film, interaction between the original scene lighting and the film. This leads to green tints in fluorescent lamps, pink tints in violet flowers green, etc. The term for the interactions at both ends is "photomeramenism".

Of the four problems described above, the present invention corrects for the interaction for the dye layers in the film and the scanner spectral sensitivity as well as correcting for the changes in the dye layers in the film with aging. Thus, the color calibration problem is reduced to a more manageable size.

SUMMARY OF THE INVENTION

It is therefore an object of the invention to measure and compensate for the interaction of the dyes in the film with the scanner spectral sensitivity.

It is another object of the invention to measure and compensate for the changes in the dye layers in the film with aging.

It is another object of the invention to minimize the operator knowledge required to perform the above objects.

These and other objects, features and advantages are accomplished by determining color crosstalk between layers of an image storage medium based on the cross correlations and autocorrelations of noise in the grain pattern in each layer of the image storage medium. Rather than relying on prior measurement under laboratory conditions, the invention scans the storage medium in a plurality of spectral bands to derive the record stored in each of the dye layers. A computer derives the autocorrelations and the crosscorrelations of a group of pixels between the plurality of color records of the scanned images each of which corresponds to one of the spectral bands. The invention is based on the observation that as each dye layer is deposited separately in the film, one would expect that the "noise" from the grain boundaries in one layer to be independent from the "noise" due to the grain boundaries in other layers. If there is correlation in noise between separate color scans, it is because the scanner is measuring the grain boundaries in more than one layer in the color scans.

To measure the noise, the image and noise must be separated, as the variations in the records in each of the dye layers due to the image are correlated between separate color scans. In one embodiment, the autocorrelations due to image detail are used to weight the value of the crosscorrelations; in areas where the image is stronger, the crosscorrelations the discounted compared to those areas in which the images are subdued. Alternatively, as image correlations tend to be low spatial frequency correlations while the noise correlations tend to be high spatial frequency correlations, the low frequency correlations can be discounted from the cross correlation calculations.

After the correlations for the color records of scanned images are determined, correction values which compensate for the interaction of the dyes in the film and the scanner spectral sensitivity are calculated. These correction factors are used to mathematically process the scans of the film image to produce a scanned image free of color crosstalk. Once the image has been corrected for color crosstalk, aging effects in the film can be quantified. Age related changes in color density can be compensated.

BRIEF DESCRIPTION OF THE DRAWINGS

These and other features, objects and advantages will be better understood by the following description in connection with the attached figures.

DETAILED DESCRIPTION OF THE DRAWINGS

Figure 1:
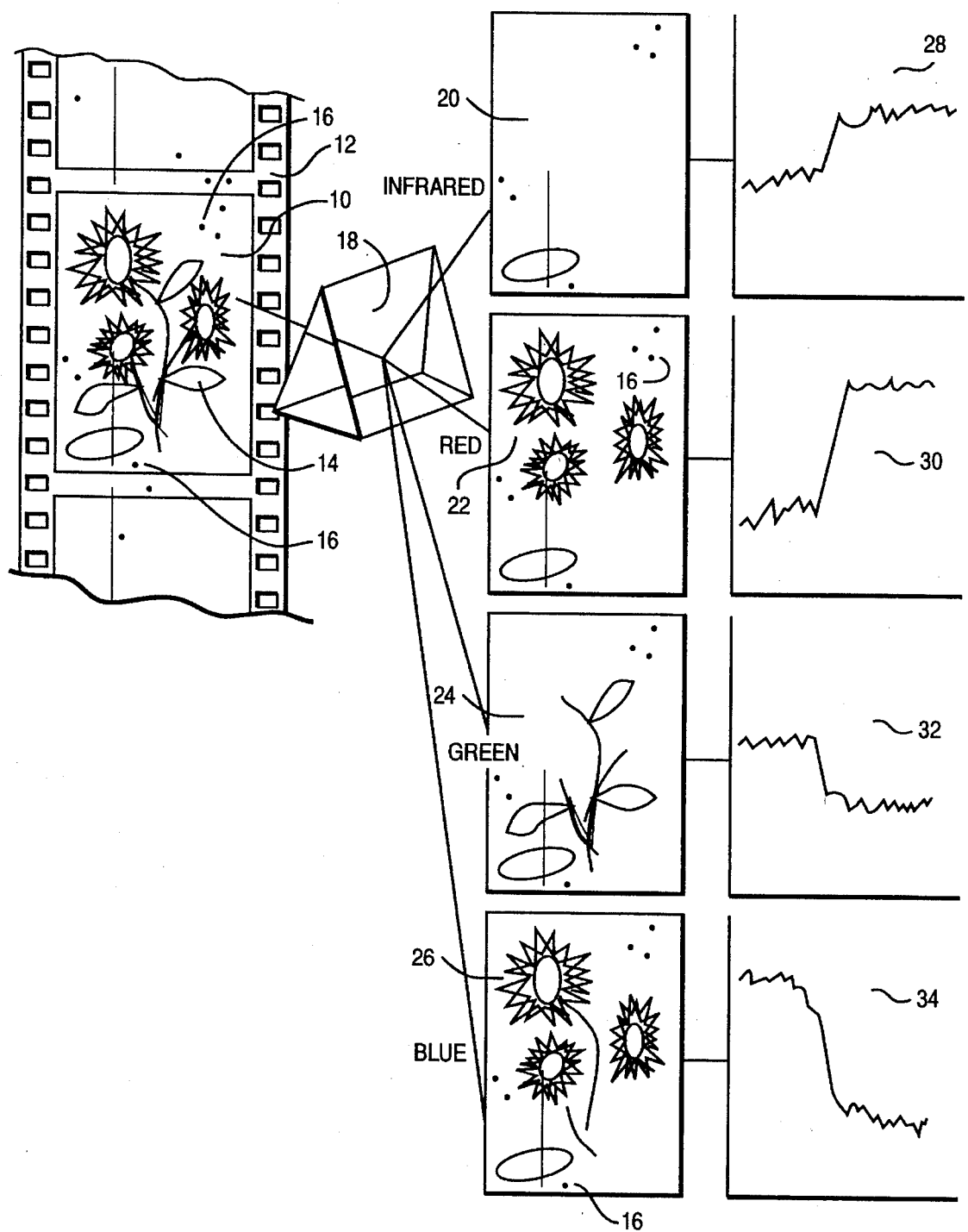
FIG. 1 illustrates the separation of an image into a plurality of images each associated with a particular range of the spectrum and graphs of color intensity in those images.

FIG. 1 illustrates the principles of the invention. A conventional film has one or more frames 10 which include a series of images 14. In accordance with the invention, a mechanism, such as a color wheel, shown as a prism 18, is employed to separate the image 14 into a plurality of individual color records, each associated with a different portion of the electromagnetic spectrum. Specifically, infrared 20, red 22, green 24 and blue 26 images of the film image 10 are separated and digitally stored in a computer. The red, green and blue records largely correspond to the cyan, magenta and yellow layer of the film storage medium.

Each of the red 22, green 24 and blue 26 images, will largely include portions of the image associated with their respective visible spectra. For example, in the green record 24, the leaves are shown as this record has those components of the image with generally green hues. Also, the non-green portions of the image 14 are substantially absent in the green image 24. However, as described above, some of the information in the green record may be the result of color crosstalk between the yellow and cyan layers in the films and the spectral sensitivity of the scanner in the green scan.

The infrared scan is used to detect imperfections in the film medium itself. As discussed in commonly assigned, copending application entitled "System and Method for Image Recovery" by A.D. Edgar, filed May 5, 1992, U.S. Pat. No. 5,266,805 and hereby incorporated by reference, the locations of the imperfections such as bubbles or scratches in the film record are identified in the infrared scan. Pixels which correspond to these locations in the red, green and blue records are corrected by renormalizing image data based on the infrared record. Unfortunately, in the infrared scan, there can be crosstalk from the red sensitive, cyan forming layer which would be identified as defects. The present invention can be used to correct for the red crosstalk in the infrared scan.

Each of the infrared 20, red 22, green 24 and blue 26 images of the film are stored in a computer as a pixel by pixel map of dye or color intensity. In the graphs 28, 30, 32 and 34, the image intensities are graphed with respect to pixel position. Graph 28 corresponds to the infrared scanned image 20, graph 30 corresponds to the red scanned image 22, graph 32 corresponds to the green scanned image 24 and graph 34 corresponds to the blue scanned image 26. Each of the graphs has plateau regions which correspond to the "noise areas" where the image intensities change relatively little in absolute magnitude in which the differences in intensity over small regions are primarily due to noise, and also sharply increasing or decreasing areas in which the differences in intensity largely correspond to the image itself. While it is understandable that the color intensities will be correlated in the image areas, one would expect that the color intensities in the noise areas would be uncorrelated as the dye grains in each layer of the film are independently deposited. The correlations due to the image, i.e. changing from a red petal to a green leaf, should be eliminated from the calculation of overall autocorrelations and crosscorrelation between the scanned images. The remaining auto and crosscorrelation between corresponding pixels in the scanned images are determined and summed to obtain overall autocorrelations and crosscorrelations for the scanned image. Ideally, these overall correlations are calculated from as large an area as possible, e.g., the entire film strip. However, even a relatively small area that is relatively free of image detail, such as a single image, could be scanned to derive approximate values of autocorrelations and crosscorrelations. These areas that are relatively free of image detail are found as areas where the total image activity, consisting of both noise and detail, is relatively uniform and low.

FIGS. 2A–2D are used to illustrate crosscorrelated and uncorrelated noise between red and green image records. There is noise at the grain barrier because the image is composed of grains. These grains form the image in a statistical sense, but the individual grains are random.

Figure 2A:
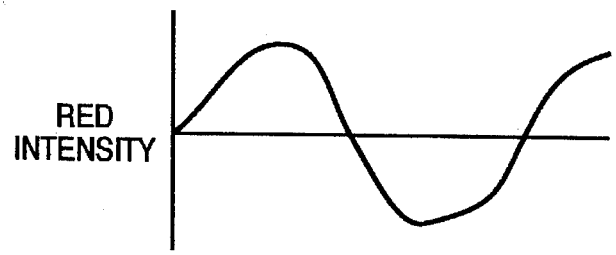
FIGS. 2A–2D are graphical representations of positively crosscorrelated, negatively crosscorrelated and uncorrelated noise.
Figure 2B:
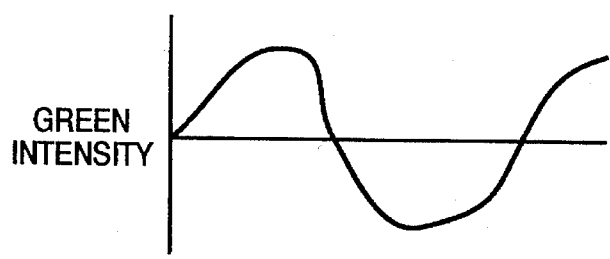
Figure 2C:
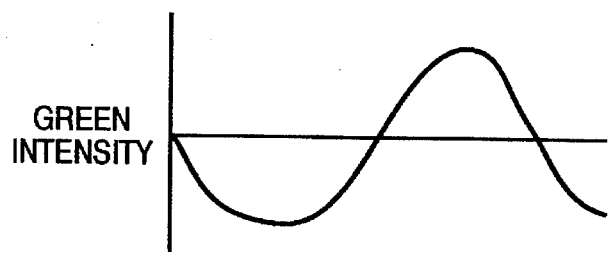
Figure 2D:
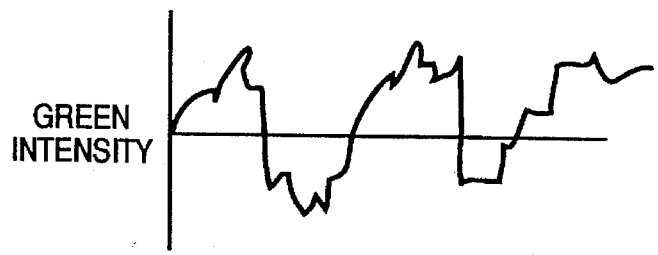

Supposing that FIG. 2A represented the image intensity in a red scanned image and FIGS. 2B–2D represented the image intensity of first, second and third sample green scanned images, several observations can be made. In the case of FIGS. 2A and 2B, the first green image and the red image are highly positively crosscorrelated. This means when the red image has a positive value, the green image is also likely to have a positive value; when the red image has a negative value, the green has a negative value. As the equation for crosscorrelation has the form $Cross_{RG} = \Sigma R(X,Y)G(X,Y)$, for every x,y value, the overall crosscorrelation between red and green images will have a high positive value. This example portrays intensity as going above and below a relative "zero". As an expedient, this zero is taken as the average intensity over an area of interest. In practice, this means the autocorrelation and crosscorrelation are applied to the image after the low frequencies, corresponding to the average term, has been removed, as will be discussed in more detail later. In the case of FIGS. 2A and 2C, there is a strong negative correlation between the red image and the second green image; when the red image is positive, the green image is negative. According to the crosscorrelation equation above, this would yield a negative value. A comparison of FIG. 2A and FIG. 2D shows that the third green image is largely uncorrelated to the red image. A positive red image intensity value could correspond to a negative or positive green image intensity value at the same pixel, so that the sum of the overall crosscorrelations at each pixel would sum to approximately zero. One would expect that the noise from the various layers would more closely resemble FIGS. 2A and 2D than the prior combinations. The mathematical crosscorrelation integrates all frequencies. Because the dominant frequency is DC, or constant bias, the DC frequency must be removed before performing the crosscorrelation. This is removed by passing the image through a high pass filter so the image data averages near zero for any area, and varies alternately above or below zero for each pixel as illustrated in FIGS. 2A–2D. As will be discussed below, this high-pass filter is also useful to remove image detail from the crosscorrelation of the grain.

The high-pass filter should be selected to pass those frequencies most affected by grain and least affected by image. There are many published designs for high-pass filters. A simple but effective filter operates on image A to produce image B, where each pixel in image B is derived by taking the value of the corresponding pixel in image A and subtracting half the value of the pixel in A just to the left, and half the pixel just to the right.

Figure 2E:
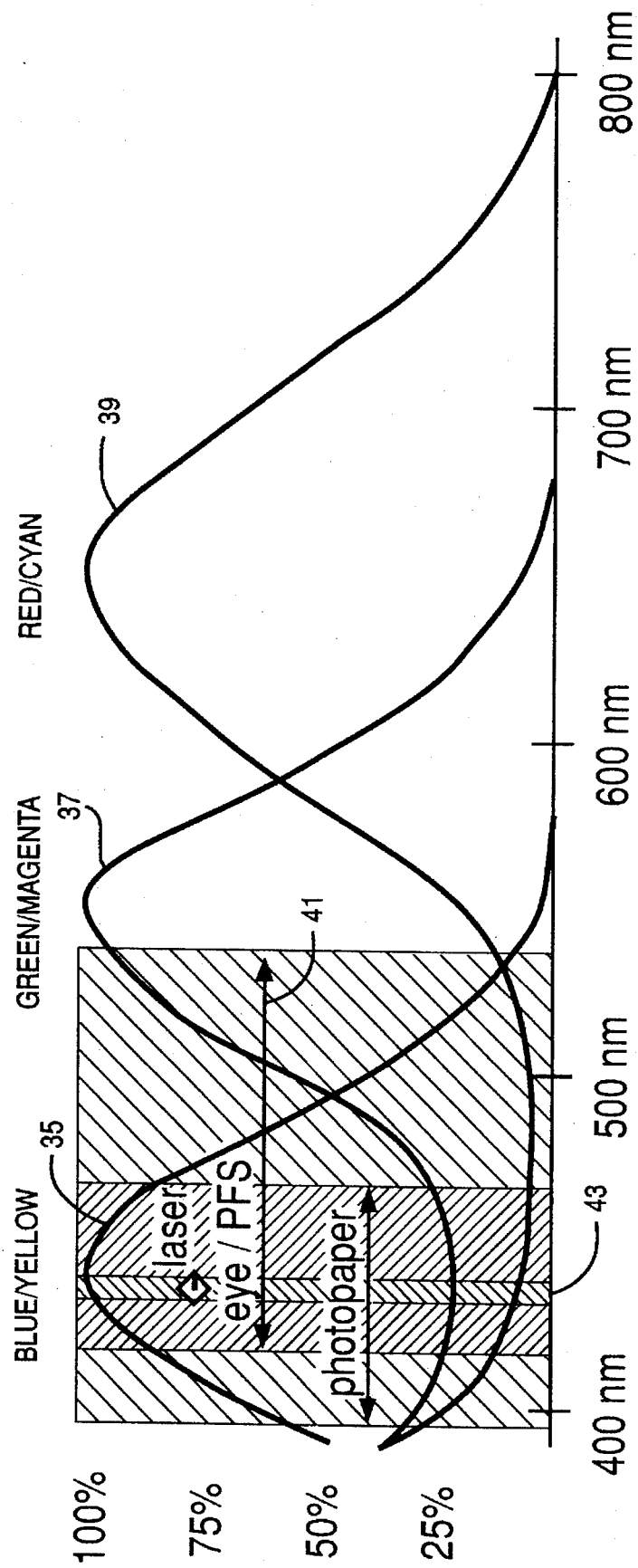
FIG. 2E depicts the absorption of film dyes and the spectral responses of several image sensors.

FIG. 2E shows the absorption of three typical film dyes and the sensitivity ranges of several common blue sensors. The absorption curve 35 of yellow dye is the predominate measure of the film's blue sensitivity layers absorption sensitivity to blue wavelengths of light, while the absorption curves 37, 39 of the magenta and cyan dyes are the predominate measures of film green and red sensitive layers to absorption of light. Blue is used as an example, the problem is similar for the other colors. Most sensors see some crosstalk from the other dyes, however, each sensor will see different amounts of crosstalk. Although the dyes shown in FIG. 2E are typical, individual films will vary and these variations will affect each of the sensors differently. For example, moving the magenta peak 37, i.e. using a different magenta dye in the film, to a longer wavelength would give less crosstalk from the green to the blue for the eye 41, but slightly more for the laser scanner 43. As the film ages, the magenta peak will shift to the right or left changing color, as well as decrease in amplitude due to overall loss in density. The changes due to age will also affect each of the sensors differently. Thus, each combination of sensor, film and film age, gives a unique crosstalk effect. Even a small variation in the crosscolor correlation has a effect on the artistic and technical accuracy of the final image. Color accuracy in a digital world suffers as a result.

Figure 3:
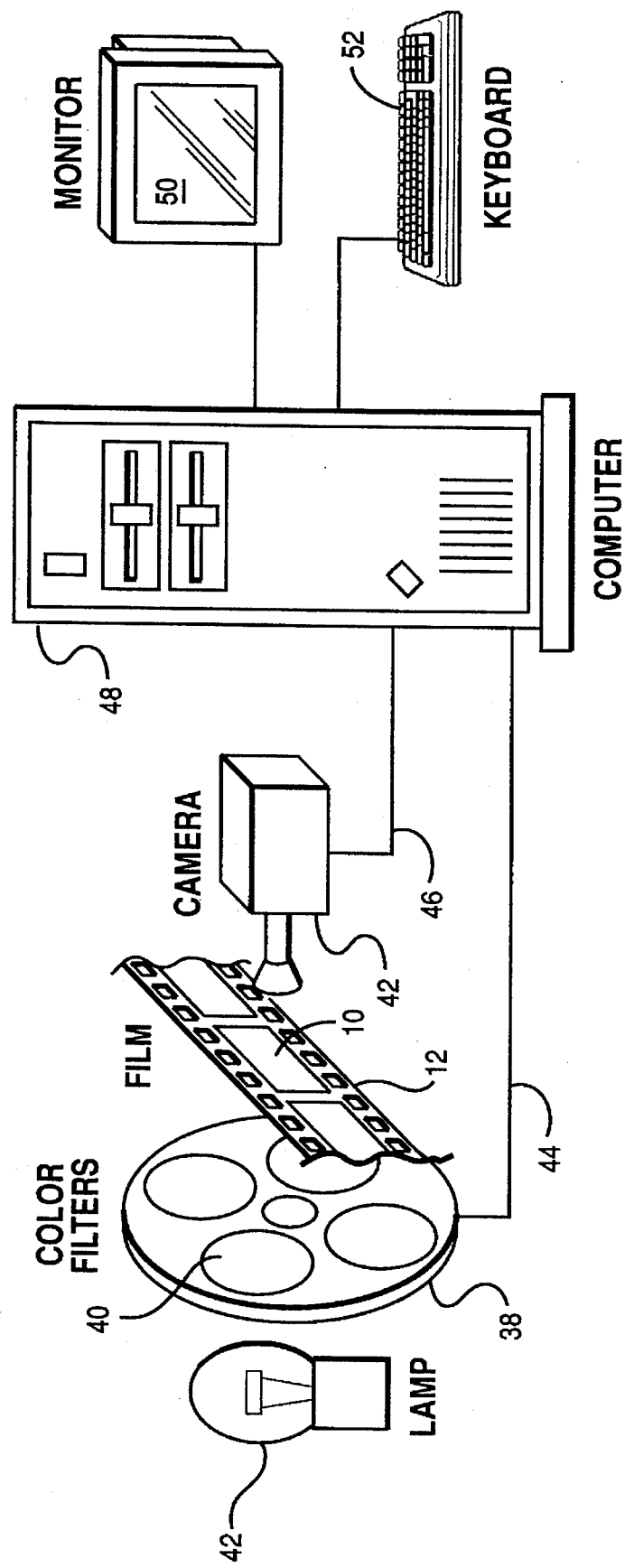
FIG. 3 shows a scanning system in which the present invention is implemented.

In FIG. 3, a representative system for image capture and measurement and correction of color crosstalk is shown. A color wheel 38 having a plurality of optical filters 40, specifically, red, green, blue and infrared filters, is used to separate the images in the various dye layers from the film 12. A light source such as a lamp 42 provides light in the red, green, blue and infrared spectra. As each of the appropriate color filters 40 are interposed between the film and the lamp, light in the red, green, blue and infrared wavelengths will be transmitted through the frame of the film and captured by a camera 42. Whereupon the video signal 46 generated may be delivered to suitable computer 48. Generating sequential color images may be automated as shown generally by control line 44 from the computer 48. The control line 44 would carry control signals to peripheral devices to advance the color filters 40 on the color wheel 38, advance the film 12 to the desired image 10 and control the intensity of the lamp 42 for the desired spectral response. The color monitor 50 is used to view the images as desired. A keyboard 52 provides user input to the computer 48.

Figure 4:
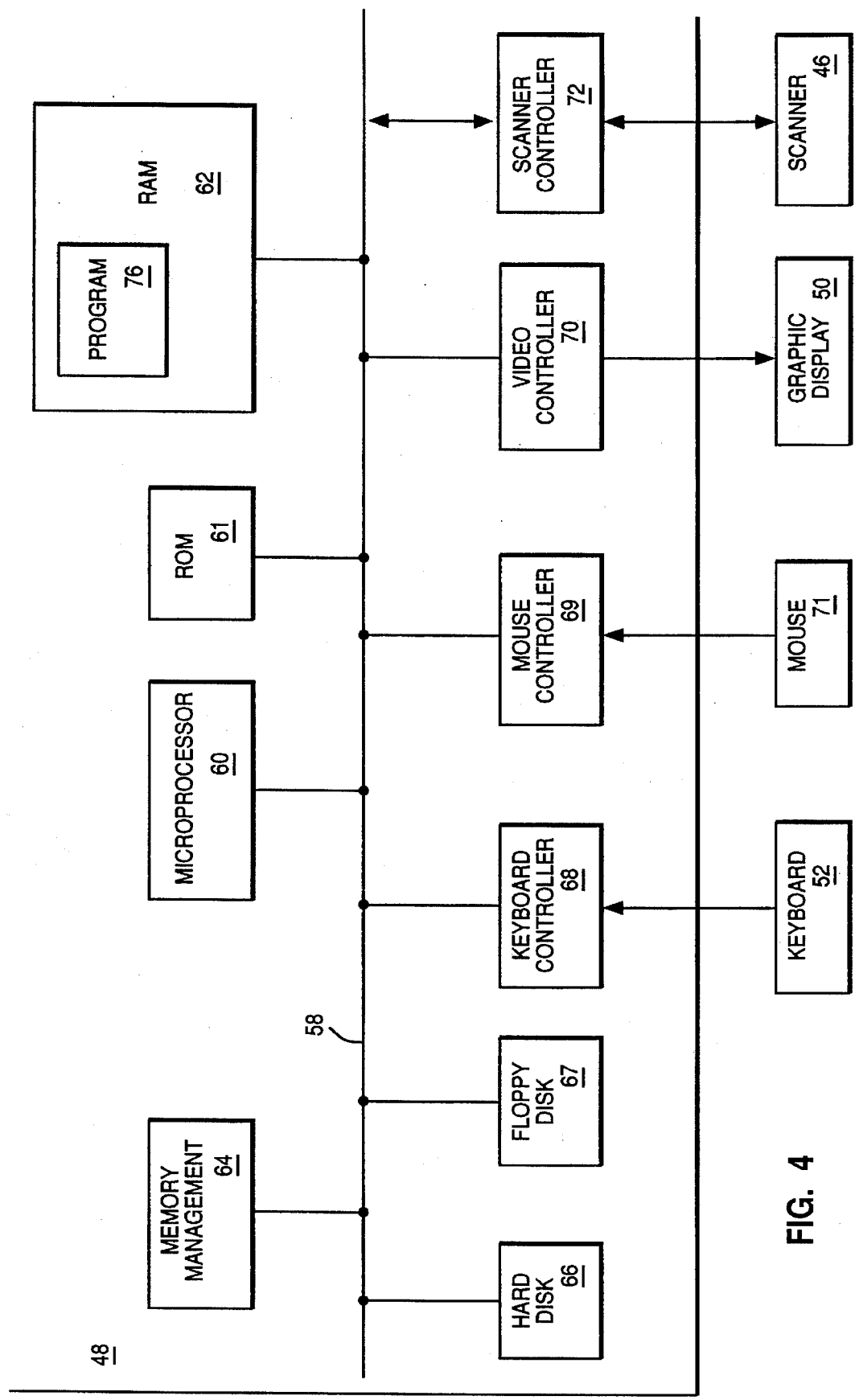
FIG. 4 is a block diagram of the system in FIG. 3.

FIG. 4 shows a block diagram of the components of the computer 48 shown in FIG. 3. The system unit 48 includes a system bus or plurality of system buses 58 to which various components are coupled and by which communication between the various components is accomplished. The microprocessor 60 is connected to the system bus 58 and is supported by read only memory (ROM) 61 and random access memory (RAM) 62 also connected to system bus 58. A microprocessor in the IBM PS/2 series of computers, for example, is one of the Intel family of microprocessors including the 386 or 486 microprocessors. One reference on IBMs PS/2 series of computers is the Technical Reference Manual Personal System/2 (Model 80) IBM Corporation Part No. 68X2256, Order Number S68X-2256. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 61 contains among other code the Basic Input-Output system (BIOS) which controls basic hardware operations such as the interaction and the disk drives and the keyboard. The RAM 62 is the main memory into which the operating system and application programs are loaded. The memory management chip 64 is connected to the system bus 58 and controls direct memory access operations including, passing data between the RAM 62 and hard disk drive 66 and floppy disk drive 67.

Also connected to the system bus or busses 58 are various I/O controllers: The keyboard controller 68, the mouse controller 69 and the video controller 70. As might be expected, the keyboard controller 68 provides the hardware interface for the keyboard 52, the mouse controller 69 provides the hardware interface for mouse 71, the video controller 70 is the hardware interface for the display 50.

A scanner controller card 72 is provided to interface with the camera 46 and has video capture function to provide digitized image data for eventual storage and manipulation by the computer 48. The computer will include enough memory to store the large amounts of data associated with high resolution digital images. One preferred embodiment of the invention as the program 76 stored in RAM 62 for controlling the microprocessor 60 and other components of the system according to the invention. For example, one module of the program 76 would be the control software necessary for generating the desired red, green, blue and infrared images. Microprocessor 60 under the control of this program 76 will generate the required signals on the system bus 58 to be transmitted to the appropriate peripheral devices. An additional component of the program 76 will include the steps necessary to auto correlate and crosscorrelate the scanned image pixel as described herein. When not resident in RAM, the program can be stored in another computer memory such as the hard disk in the hard disk drive 66 or a removable computer memory such as a floppy disk for floppy disk drive 67.

For example, the lamp, filter wheel film holder and camera assembly may be contained in a Nikon film scanner model LS 3500. A scanner is modified so during the infrared scan, the built in infrared filter is removed and a Kodak Wratten 87 C filter is inserted in its place. At this time, the voltage in the lamp is lowered from the normal 12 volts to 5 volts. A GPIB card manufactured by National Instruments of Austin, Tex. interfaces the computer with the film scanner.

Figure 5:
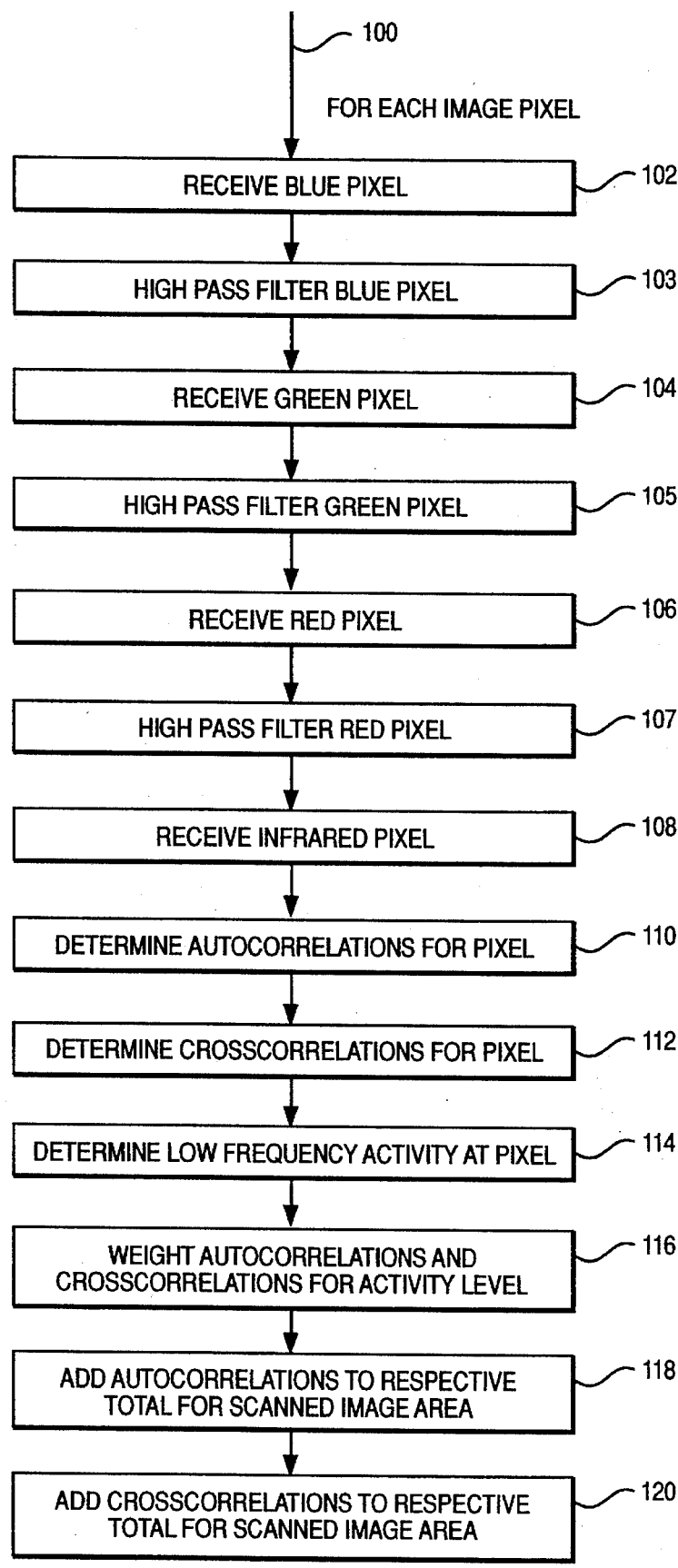
FIG. 5 is a flow diagram of determining the autocorrelations and crosscorrelations due to interactions between the spectral response of a scanner and the dye layers in a film according to the present invention.

FIG. 5 shows the process by which the correlated noise is separated from the scanned image. Once the red, green, blue and infrared images have been digitized and appropriately stored for retrieval, the image processing will commence by retrieving pixel data. Each pixel digitized and captured from the film image 10 will correspond to a red, green, blue and infrared pixel associated with the respective red, green, blue and infrared images 20–26 of FIG. 1. As each set of red, green, blue and infrared pixels correspond to the same location, their intensity values are associated and stored in and retrieved from the computer memory. For each group of pixels, the crosscorrelation of the noise between colors, due to crosstalk between the dye layers and the layers in the scanner, is determined.

Referring to FIG. 5, the scanned image data represented by arrow 100 are received. A raw blue pixel value is received in step 102; a raw green pixel is received in step 104. A raw red pixel is received in step 106 and an infrared pixel is received in step 108. These raw pixel values are the values seen by the scanner directly. They will contain some crosstalk between the color records, which the processing now described will remove. As will be discussed below with reference to FIG. 10, these pixels are first filtered by a high-pass spatial filter to remove image detail from the grain, because the image detail would yield a false measure of correlations. Also, the filtering process will remove the DC frequency bias. This high pass filtering is applied respectively in steps 103, 105, and 107 of FIG. 5. The intensity values of the respective blue, green, red and infrared pixels are used to determine the autocorrelations and crosscorrelations at this pixel. In step 110, the autocorrelation for a particular pixel at location X,Y are determined by the equations, $$Auto_R = R(X,Y)^2$$

$$Auto_B = B(X,Y)^2$$

$$Auto_G = G(X,Y)^2$$

$$Auto_I = I(X,Y)^2$$

Where R(X,Y) is the intensity value for the high-pass filtered, red scanned pixel at location X,Y, B(X,Y) is the high-pass filtered, blue scanned pixel, G(X,Y) is the intensity value for the high-pass filtered, green pixel scanned and I(X,Y) is the intensity value for the high-pass filtered, infrared scanned pixel. $Auto_R$, $Auto_G$, $Auto_B$ and $Auto_I$ represent the autocorrelations for the red, blue, green and infrared pixels respectively.

Note that the autocorrelation of a single pixel seems rather meaningless, if it is just the square of that pixel. It will have meaning however in a statistical sense when averaged over the entire image in steps 118 and 120.

Next, in step 112, the crosscorrelations are determined for each pixel. The crosscorrelation increments are given by equations:

$$Cross_{RG} = R(X,Y)*G(X,Y)$$

$$Cross_{RB} = R(X,Y)*B(X,Y)$$

$$Cross_{BG} = B(X,Y)*G(X,Y)$$

$$Cross_{RI} = R(X,Y)*I(X,Y)$$

$$Cross_{BI} = B(X,Y)*I(X,Y)$$

$$Cross_{GI} = G(X,Y)*I(X,Y)$$

Where $Cross_{GI}$, $Cross_{RB}$, $Cross_{BG}$, $Cross_{RI}$, $Cross_{BI}$ and $Cross_{GI}$ are the cross correlations between red and green pixels, red and blue pixels, blue and green pixels, red and infrared pixels, blue and infrared pixels and green and infrared pixels respectively.

Next, in step 114, the activity at this particular pixel is determined. This is done by applying either band-pass or a high pass filter to the image original image, as will be described in more detail in relation to FIG. 10. By determining how much image activity there is, the potential interference with grain measurements is assessed. In step 116, the autocorrelations and crosscorrelations for this pixel are weighted according to the inverse of the activity level. Therefore, areas with minimum image activity will be those primarily used to determine the grain correlations. Next, in steps 118 and 120, the weighted auto and crosscorrelation increments are summed to their respective totals for the scanned image area. This process is repeated pixel by pixel for the entire scanned image.

The following program may be used to calculate the summed, normalized auto and crosscorrelations. Receive image R(X,Y), G(X,Y) and B(X,Y)

$$SumAuto_R = 0$$

$$SumAuto_G = 0$$

$$SumAuto_B = 0$$

$$SumCross_{RG} = 0$$

$$SumCross_{RB} = 0$$

$$SumCross_{BG} = 0$$

For each X, for each Y, Note: this program assumes access to a pixel out of range returns "0".

$$High_R = R(X,Y) - \tfrac{1}{2}*R(X-1,Y) - \tfrac{1}{2}*R(X+1,Y)$$

$$High_G = G(X,Y) - \tfrac{1}{2}*G(X-1,Y) - \tfrac{1}{2}*G(X+1,Y)$$

$$High_B = B(X,Y) - \tfrac{1}{2}*B(X-1,Y) - \tfrac{1}{2}*B(X+1,Y)$$

$$Auto_R = (High_R)^2$$

$$Auto_G = (High_G)^2$$

$$Auto_B = (High_B)^2$$

$$Cross_{RG} = High_R High_G$$

$$Cross_{RB} = High_R High_B$$

$$Cross_{BG} = High_B High_G$$

$$mid = (R(X,Y) - R(X+1,Y)) + (G(X,Y) - G(X+1,Y)) + (B(X,Y) - G(X+1,Y)).$$

Weight = 1/(Mid+K) Note: K is a constant to prevent division by zero and is chosen to be smaller than Mid for most pixels.

$$SumAuto_R += Auto_R * Weight$$

SumAuto$_G$+=Auto$_G$*Weight

SumAuto$_B$+=Auto$_B$*Weight

SumCross$_{RG}$+=Cross$_{RG}$*Weight

SumCross$_{RB}$+=Cross$_{RB}$*Weight

SumCross$_{BG}$+=Cross$_{BG}$*Weight

Note: "+=" is a "C" language expression meaning to add to the variable.

Once the crosscorrelations and autocorrelations are determined, the correction coefficients can be calculated in a variety of ways. A linear algebra matrix approach may be used, although a more accurate, but more complex method is discussed below with reference to FIGS. 12 and 13. Those skilled in the art would recognized that other processing might be utilized as well.

Figure 6:
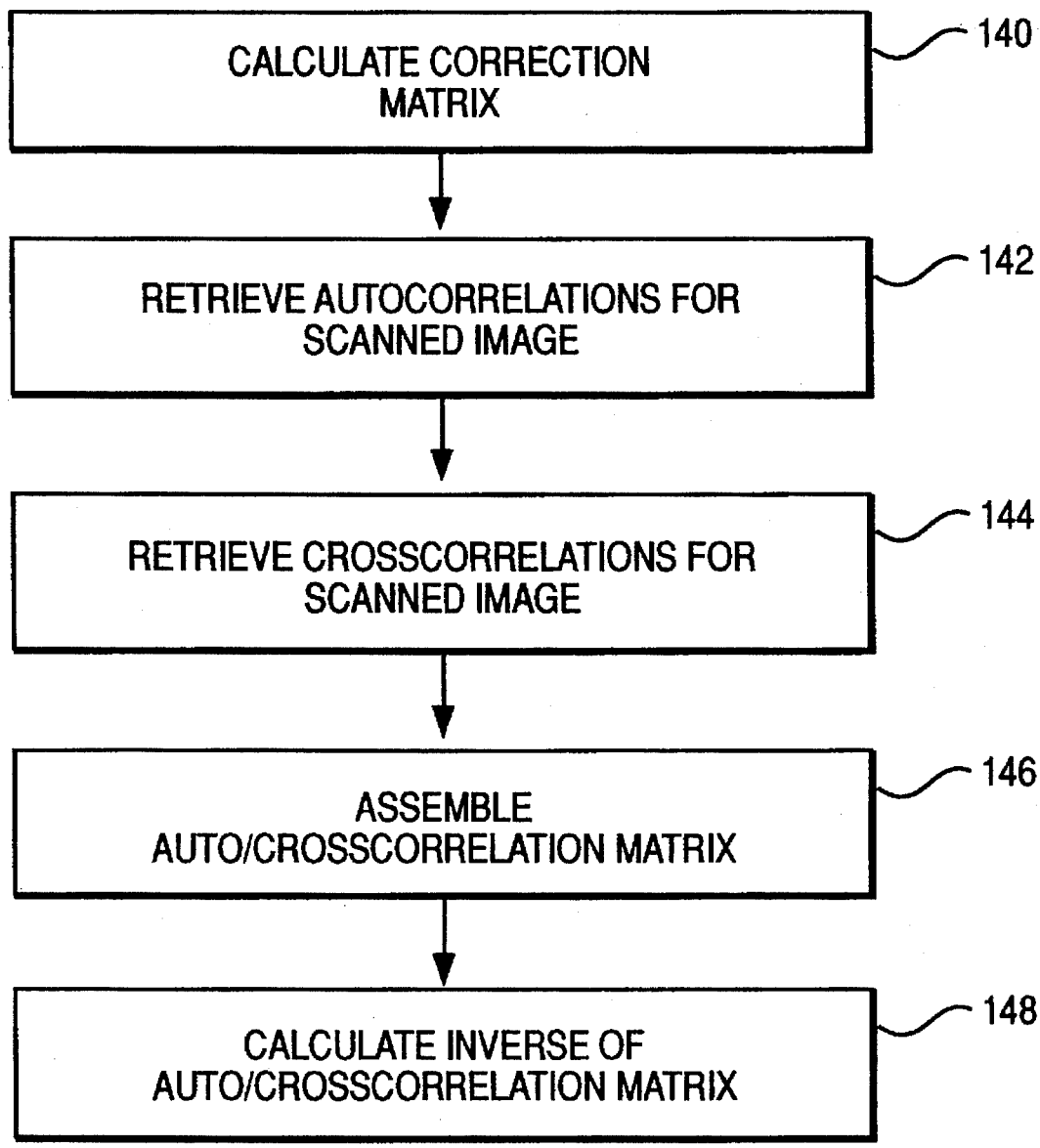
FIG. 6 is a block diagram of calculating the correction coefficients.

As shown in FIG. 6, in response to a call for the program module to calculate the correction matrix, step 140, the autocorrelations and crosscorrelations for the scanned image are retrieved, steps 142 and 144. The summed, normalized autocorrelations and crosscorrelations are assembled into the matrix, step 146. The matrix is solved to reestablish independence by calculating the inverse of the assembled auto/crosscorrelations matrix, step 148. Because of the crosscorrelation coefficients are not completely independent of each other, taking the inverse does not completely solve the problem. The relative amplitude of the correction coefficients can be determined, but certain assumptions must be inside for hue.

The generation of this matrix will now be discussed.

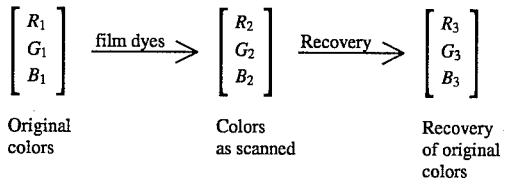

$$\begin{bmatrix} R_1 \\ G_1 \\ B_1 \end{bmatrix} \xrightarrow{\text{film dyes}} \begin{bmatrix} R_2 \\ G_2 \\ B_2 \end{bmatrix} \xrightarrow{\text{Recovery}} \begin{bmatrix} R_3 \\ G_3 \\ B_3 \end{bmatrix}$$

Original colors    Colors as scanned    Recovery of original colors

Let $R_1$, $G_1$, and $B_1$ be the red, green, and blue densities of the separate layers in the original film. Similarly let $R_2 \ldots B_2$ be the colors as scanned, and $R_3 \ldots B_3$ be the colors recovered by the method of this invention.

In the linear model, these colors are related by a matrices as follows:

$$\begin{bmatrix} R_2 \\ G_2 \\ B_2 \end{bmatrix} = \begin{bmatrix} RR_{12} GR_{12} BR_{12} \\ RG_{12} GG_{12} BG_{12} \\ RB_{12} GB_{12} BB_{12} \end{bmatrix} \begin{bmatrix} R_1 \\ G_1 \\ B_1 \end{bmatrix}$$

and $$\begin{bmatrix} R_3 \\ G_3 \\ B_3 \end{bmatrix} = \begin{bmatrix} RR_{23} GR_{23} BR_{23} \\ RG_{23} GG_{23} BG_{23} \\ RB_{23} GB_{23} BB_{23} \end{bmatrix} \begin{bmatrix} R_2 \\ G_2 \\ B_2 \end{bmatrix}$$

Where $GR_{12}$, for example, is the amount of $G_1$ leaking into $R_2$ by crosscolor contamination caused by interaction of the dyes and scanner, and $GR_{23}$, for example, is the amount of $G_2$ that needs to be "added" ($GR_{23}$ may be negative) into the recovered red channel to counter the contamination caused by $GR_{12}$, when computing the output $R_3$.

$RR_{12}$, $GR_{12} \ldots BB_{12}$ or $R_1 \ldots B_1$, are not known, however, from the correlation terms, the invention seeks to find $RR_{23}$, $GR_{23} \ldots BB_{23}$ terms that best undo the effects of the unknown $RR_{12}$, $GR_{12} \ldots BB_{12}$ to recover $R_3 \ldots B_3$ as estimates of $R_1 \ldots B_1$.

In finding $RR_{23}$, $GR_{23}$, $\ldots$ $BB_{23}$, use the correlation terms found earlier.

$$RR_{2c} \; GG_{2c} \; BB_{2c} \; RG_{2c} \; RB_{2c} \; GB_{2c}$$

where $RG_{2c}$, for example, is the crosscorrleation between $R_2$ and $G_2$, and $RR_{2c}$ is the autocorrelation of $R_2$.

Further assume, $$RG_{1c}=0, \; RB_{1c}=0, \; \text{and} \; GB_{1c}=0$$

that is, that the crosscorrelations between the original $R_1$, $G_1$, and $B_1$ are all zero. This was discussed earlier as a consequence of the independence of the grain in each layer. Because of this assumption, the goal will be to pick the matrix coefficients $RR_{23}$, $GR_{23}$ $\ldots$ $BB_{23}$ such that also $RG_{3c}=0$, $RB_{3c}=0$, and $GB_{3c}=0$, where $RG_{3c}$, for example, is the crosscorrelation of the estimated colors output by the algorithm $R_3$ and $G_3$.

Further, to maintain unity contrast, constrain $$RR_{23}+GR_{23}+BR_{23}=1$$

$$RG_{23}+GG_{23}+BG_{23}=1$$

$$RB_{23}+GB_{23}+BB_{23}=1$$

Contrast variations caused by dye fading is correctable separately, and is discussed elsewhere in this description. Now $RG_{3c}$ is the crosscorrelation of $R_3$ and $G_3$.

but $R_3=RR_{23} \cdot R_2+GR_{23} \cdot G_2+BR_{23} \cdot B_2$ and $G_3=RG_{23} \cdot R_2+GG_{23} \cdot G_2+BG_{23} \cdot B_2$ therefore $$\begin{aligned}
RG_{3c} = \; & RR_{2c} \cdot (RR_{23} \cdot RG_{23}) \\
+ \; & GG_{2c} \cdot (GG_{23} \cdot GR_{23}) \\
+ \; & BB_{2c} \cdot (BR_{23} \cdot BG_{23}) \\
+ \; & RG_{2c} \cdot (RR_{23} \cdot GG_{23} + GR_{23} \cdot RG_{23}) \\
+ \; & RB_{2c} \cdot (RR_{23} \cdot BG_{23} + BR_{23} \cdot RG_{23}) \\
+ \; & GB_{2c} \cdot (GR_{23} \cdot BG_{23} + BR_{23} \cdot GG_{23})
\end{aligned}$$

Similarly $$\begin{aligned}
RB_{3c} = \; & RR_{2c} \cdot (RR_{23} \cdot RB_{23}) \\
+ \; & GG_{2c} \cdot (GB_{23} \cdot GR_{23}) \\
+ \; & BB_{2c} \cdot (BR_{23} \cdot BB_{23}) \\
+ \; & RG_{2c} \cdot (RR_{23} \cdot GB_{23} + GR_{23} \cdot RB_{23}) \\
+ \; & RB_{2c} \cdot (RR_{23} \cdot BB_{23} + BR_{23} \cdot RB_{23}) \\
+ \; & GB_{2c} \cdot (GR_{23} \cdot BB_{23} + BR_{23} \cdot GB_{23})
\end{aligned}$$

and $$\begin{aligned}
GB_{3c} = \; & RR_{2c} \cdot (RG_{23} \cdot RB_{23}) \\
+ \; & GG_{2c} \cdot (GB_{23} \cdot GG_{23}) \\
+ \; & BB_{2c} \cdot (BG_{23} \cdot BB_{23}) \\
+ \; & RG_{2c} \cdot (RG_{23} \cdot GB_{23} + GG_{23} \cdot RB_{23}) \\
+ \; & RB_{2c} \cdot (RG_{23} \cdot BB_{23} + BG_{23} \cdot RB_{23}) \\
+ \; & GB_{2c} \cdot (GG_{23} \cdot BB_{23} + BG_{23} \cdot GB_{23})
\end{aligned}$$

In the above formulas, the correlation terms $RR_{2c} \ldots GB_{2c}$ are known from measurements on the image as discussed earlier. The crossover matrix coefficients $RR_{23}$, $GR_{23} \ldots BB_{23}$ may be varied subject to the unity contrast constraint mentioned above. They should be varied so as to make $RG_{3c}=0$, $RB_{3c}=0$, and $GB_{3c}=0$.

The coefficient values satisfying these criteria will be found iteratively in the described embodiment.

As an expedient in finding the solution, note that the output red $R_3$ normally contains mostly the input red $R_2$, and therefore the term $RR_{23}$ will predominate over $GR_{23}$ and $BR_{23}$, and will in fact be approximately 1. Similarly with the green and blue components. Further, the autocorrelation terms $RR_{2c}$, $GG_{2c}$, and $BB_{2c}$ normally predominate over the crosscorrelation terms. By letting $RR_{23}$, $GG_{23}$ and $BB_{23}$ be 1, and letting the product of any two non-predominate terms be zero, the formulas reduce to:

$$RG_{3c} \approx RG_{23} \cdot RR_{2c} + GR_{23} \cdot GG_{2c} + RG_{2c}$$

$$RB_{3c} \approx RB_{23} \cdot RR_{2c} + BR_{23} \cdot BB_{2c} + RB_{2c}$$

$$GB_{3c} \cdot GB_{23} \cdot GG_{2c} + BG_{23} \cdot BB_{2c} + GB_{2c}$$

The above formulas are only coarse approximations, however they are adequate to select what to vary at each iteration of an iterative solution.

For example, if $RG_{3c}$ is positive, it needs to be made lower. To lower $RG_{3c}$, since $RG_{2c}$ is fixed by measurement, $RG_{23}$ and $GR_{23}$ remain to have an increment subtracted from them. Remembering the unity constraint, the increment subtracted from $RG_{23}$ should be added into $GG_{23}$, and the increment subtracted from $GR_{23}$ should be added into $RR_{23}$.

An algorithm is now given to solve for the matrix coefficients:

select an increment value $\Delta$, such as 0.01 measure correlation coefficients $RR_{2c}$, $GG_{2c}$, $BB_{2c}$, $RG_{2c}$, $RB_{2c}$, and $GB_{2c}$ as described earlier Initially set $RR_{23}=GG_{23}=BB_{23}=1$ and $GR_{23}=BR_{23}=BG_{23}=RG_{23}=RB_{23}=GB_{23}=0$ Loop:

calculate $RG_{3c}$, $RB_{3c}$, and $GB_{3c}$ from the matrix and correlation terms using the full formulas developed earlier.

$SRG$ = $\Delta$ if $RG_{3c} > \Delta \cdot (RR_{23} + GG_{23})$
= $-\Delta$ if $RG_{3c} < -\Delta \cdot (RR_{23} + GG_{23})$
= 0 otherwise $SRB$ = $\Delta$ if $RB_{3c} > \Delta \cdot (RR_{23} + BB_{23})$
= $-\Delta$ if $RB_{3c} < -\Delta \cdot (RR_{23} + BB_{23})$
= 0 otherwise $SGB$ = $\Delta$ if $GB_{3c} > \Delta \cdot (GG_{23} + BB_{23})$
= $-\Delta$ if $GB_{3c} < -\Delta \cdot (GG_{23} + BB_{23})$
= 0 otherwise Note in the above that from the formulas derived earlier, if $RG_{23}$ and $GR_{23}$ are incremented by $\Delta$, then $RG_{3c} \approx RG_{23} \cdot RR_{2c} + GR_{23} \cdot GG_{2c} + RG_{2c}$ increments by ($RR_{2c} + GG_{2c}$). If $SRG=SRB=SGB=0$ then the solution is complete, terminate successfully.

$RG_{23} -= SRG$ $GG_{23} += SRG$ $GR_{23} -= SRG$ $RR_{23} += SRG$ $RB_{23} -= SRB$ $BB_{23} += SRB$ $BR_{23} -= SRB$ $RR_{23} += SRB$ $GB_{23} -= SGB$ $BB_{23} += SGB$ $BG_{23} += SGB$ $GG_{23} += SGB$

Go to "Loop"

Figure 7:
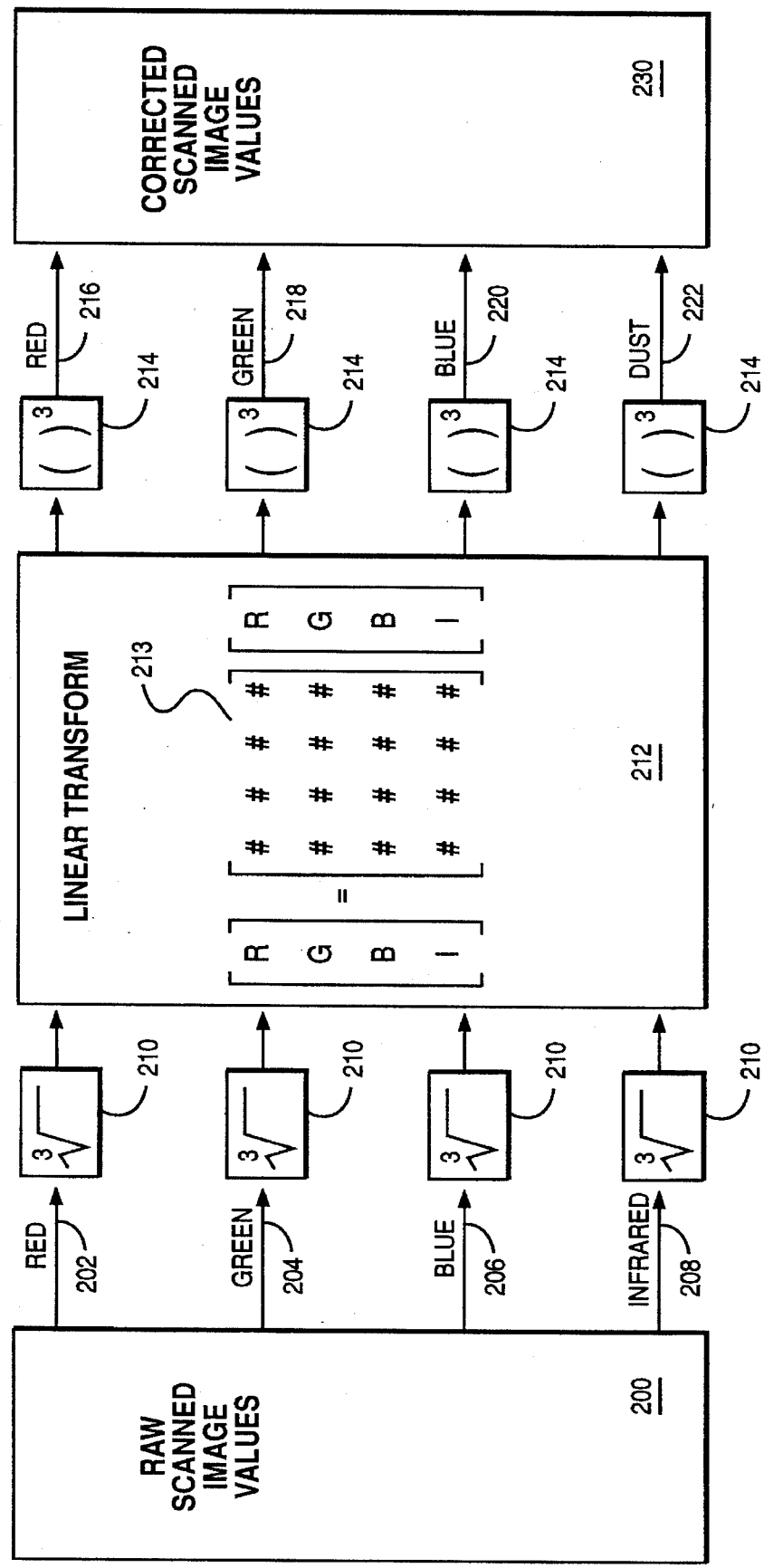
FIG. 7 illustrates correcting the scanned image by the correction coefficients.

The matrix of correction coefficients can now be applied to the raw color scans to separate the color crosstalk from the various records. FIG. 7 depicts one process in which the matrix calculated in FIG. 6 is used. The raw scan image values 200 are retrieved pixel by pixel in red 202, green 204, blue 206 and infrared 208 image intensity data streams. As an approximation to the real world and for reasons which are described below, the cubic root of the image intensities are calculated in step 210. In the linear transform step 212, the cubic root values are multiplied by the correction coefficients in matrix 213. The resultant values are cubed in step 214 to bring them up to the linear values, and stored as corrected red, green, blue and infrared data streams 216, 218, 220 and 222 to be assembled into the corrected scanned image values 230.

As mentioned above, the linear algebra method must be modified to compensate for the non-linearities of the real world. The linear transform takes place in the cubic root domain to approximate the real world case of dyes which vary in absorption and transmittance with wavelength and sensors which scan in successive broad ranges of wavelengths for the spectral bands. To gain a better understanding of why the cubic root provides a good approximation, consider the following two cases: First, assume the dyes had a perfect square spectral response, that is, they completely transmit some wavelengths, while other wavelengths are absorbed at a fraction independent of wavelength and each color wavelength is absorbed by one and only one colored dye. Also, assume each color sensor has a spectral response over a broad range of wavelengths, as they would in the real world. In this first case, the linear matrix separates perfectly when applied in the linear domain, treating light and dark areas equally. Second, assume the absorptions of the dyes vary with wavelength as they do in the real world, but assume the scanner is sensitive to a set of single wavelengths, as would be the case if the scanner used colored lasers as light sources. In this second case, the linear matrix separates perfectly when applied in the logarithmic domain, expanding dark areas and compressing light areas in proportion to their lightness. While the cubic root does not separate perfectly, it is a good compromise between these two cases, expanding dark areas and compressing light areas intermediately between the above two cases, and works well with real world dyes viewed with broad spectral response sensors.

The effects of aging will now be discussed. Aging creates two changes: Changes in color, such as a cyan dye becoming greenish, and changes in density, which may affect the different color records to different degrees. The invention thus far reduces the effects of dye colors, whether caused by the varying characteristics of new dyes, or the varying characteristics of a single dye with aging. Once the invention has removed the effects to dye color changes and retrieved the pure separate color images, the effects of aging from these pure separate color images can be removed using the changes common to black and white images in particular contrast stretch between black and white points in the image. It should be emphasized that applying this contrast stretch works well only after the invention has separated the color records. Applying contrast stretch as does the prior art to the image before separation produces further color artifacts.

Contrast stretch is applied to a monochrome image, in this case, it is applied separately to the red, green, and blue images after the method of this invention has separated them fully.

In contrast stretch, the lightest pixels and darkest pixels are found. A new contrast translation curve is calculated so the lightest pixels map to pure white, and the darkest pixels to pure black. This is called contrast stretch because usually the degrading affects of aging is to make the darkest pixels lighter than pure black or the lightest pixels darker than pure white, and the mapping in effect "stretches" the gray scale of the pixels to cover the range from pure black to pure while.

Figure 8:
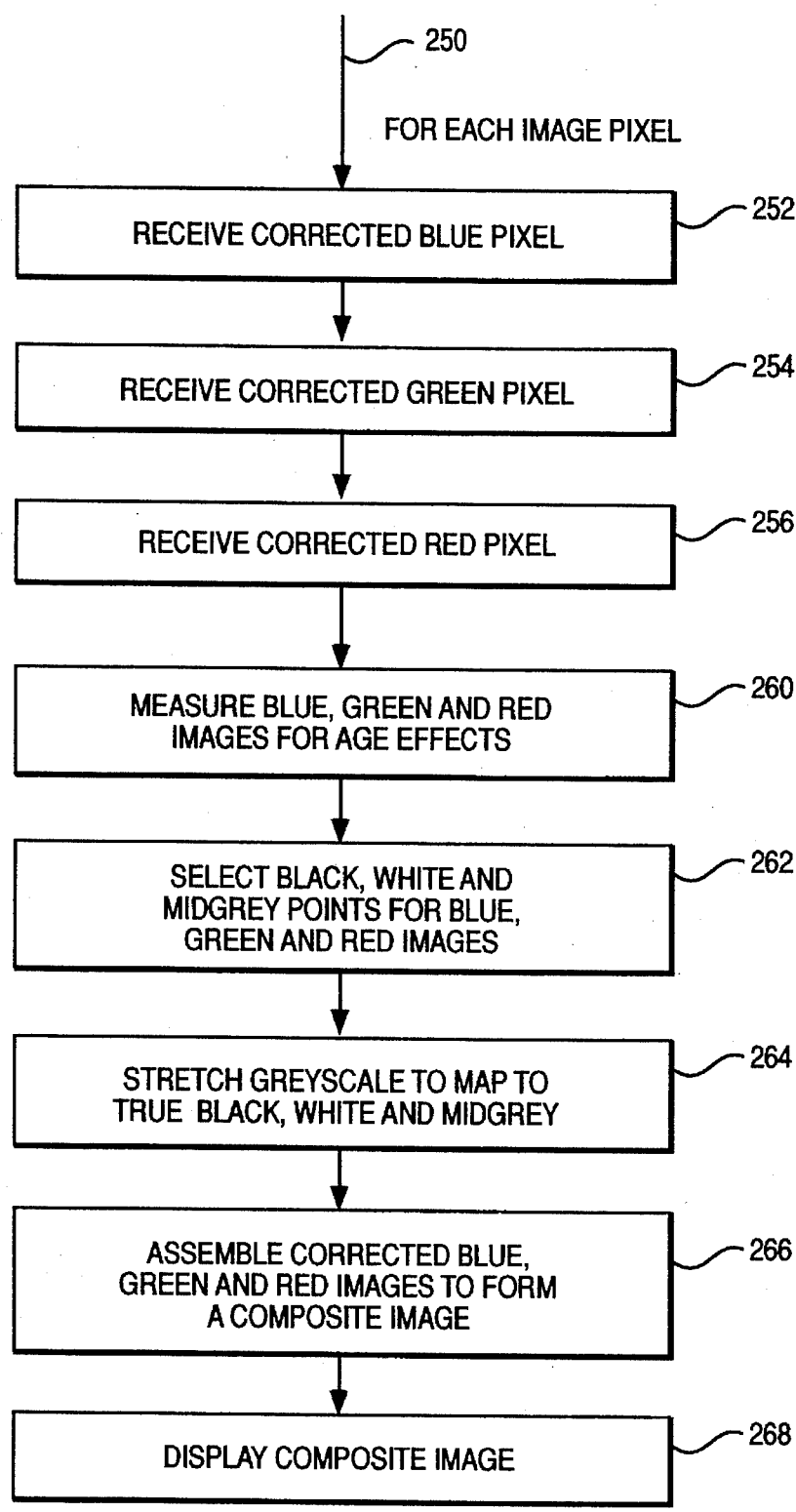
FIG. 8 is a block diagram of the process for correcting for aging effects in a film record.

As shown in the flow diagram of FIG. 8 for each pixel, step 215, the corrected blue, green, red pixels are received in steps 252 through 254 and 256. Each of these images is measured separately for loss of trait due to age affects, step 260. As mentioned above, the age affects due to dye color changes should be largely corrected at this point by the method of this invention described earlier so that only the changes in contrast of the individual blue, green, and red records are left to be corrected. The process for correcting age effects begins in step 262. In step 262, the black, white and mid-gray points for each of the blue, green and red images is chosen. The black point is the value of the lowest intensity pixels assumed to have been black prior to aging; the white point is the value of the highest intensity, pixels, assumed to have been white while prior to aging. The mid-gray point is a point chosen for a middle perceived intensity for that particular color image. Each of the blue, green and red pixels in the respective images are then assigned values along the scale from the black to the mid-gray to the white for the respective color curve. Contrast stretch moves calculated black, white, and the mid-gray points of the curve of the aged image to levels perceived as while and mid grays by recalculating the intensity levels along the grayscale cure in step 264. In step 266, the recalculated points are assembled into a composite image and in step 268 they are displayed to the user.

As discussed above, while the image intensity of the noise is uncorrelated, the image is correlated and therefore, the noise must be separated from the image before measuring the correlations. Fortunately, this is not a noise reduction problem where the image and noise must be totally separated. According to the invention, deriving the correlations of the noise for any portion of the image will be acceptable. The embodiment of the invention discussed below uses the combination of spatial and frequency exclusion by finding the correlations for the high frequency portions of the least detailed part of the image to determine the correlations for the noise between dye layers.

Figure 9:
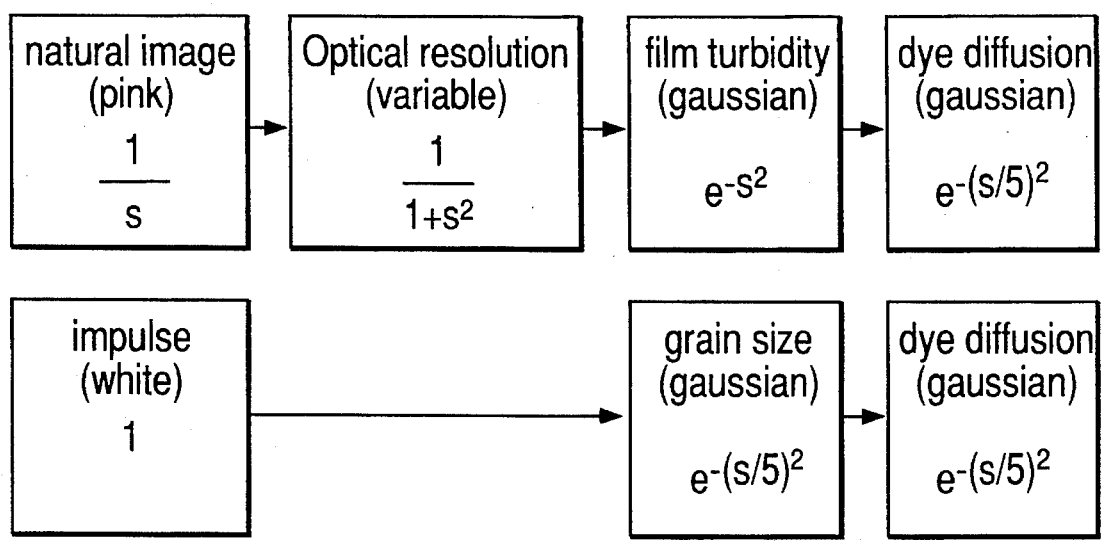
FIG. 9 depicts the spatial frequency spectrum of signal and noise.

FIG. 9 presents the causes of the alteration of the spatial frequency spectrum of both the image signal and grain noise. In the real world, boundary step functions predominate in the image, attenuating source signal inversely proportional to frequency. The camera lens attenuates the high frequencies. Next, optical turbidity in the film attenuates the high frequencies in a gaussian process giving a fairly complete cutoff. Finally, color coupler diffusion attenuates at a frequency at about 5 times that of turbidity. There is virtually nothing above about 40 line pairs per millimeter spatial frequency recorded with today's lenses and film from real-world images. This cutoff corresponds to a 2000 by 3000 pixel scan of 35 millimeter film. Conversely, the grain noise begins with a flat spectrum and is attenuated only at very high frequencies by grain size and dye diffusion as discussed above, which have an effect above 100 line pairs per millimeter.

Figure 10:
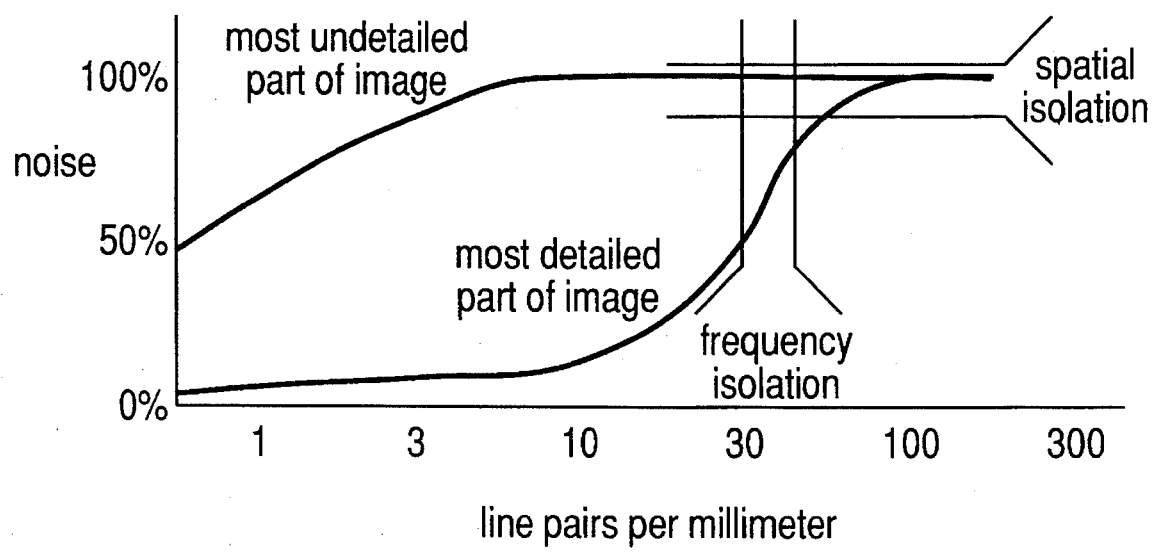
FIG. 10 is a graph of the grain noise as a percent of total image activity.
Figure 11:
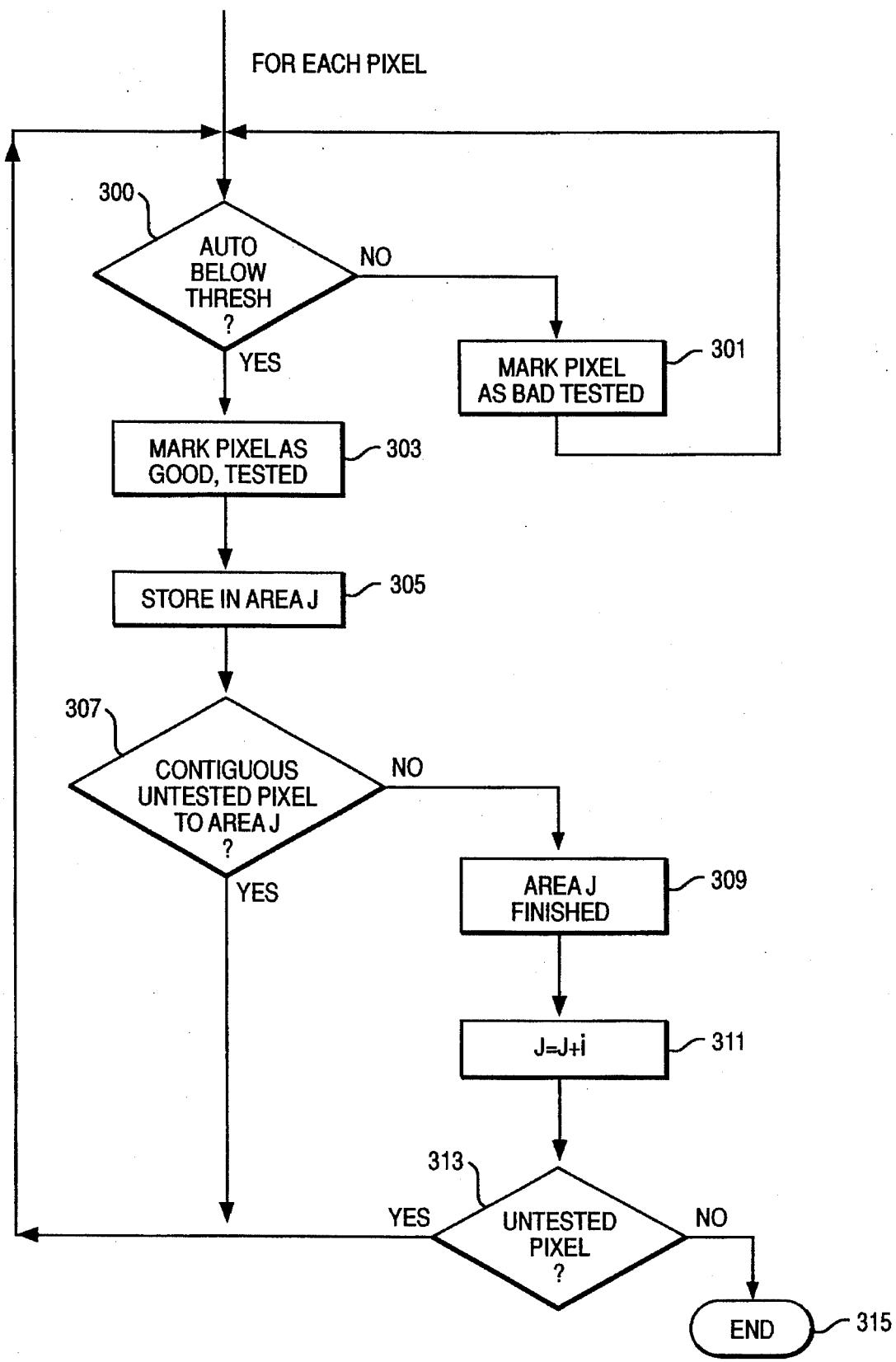
FIG. 11, this flow diagram for identifying areas of the image which can be used for measuring crosscorrelation.

FIG. 10 depicts how an imageless component of noise may be isolated. In theory, one could pass only the spatial frequencies above 100 line pairs per millimeters to totally isolate some noise. But in practice, this resolution is difficult for present day scanners. A practical solution first isolates frequencies around 40 line pairs to eliminate most of the image. Next, a pruning or weighting emphasizes those parts of the image in which the energy seen at these high frequencies is predominantly from grain noise, and prunes out or emphasizes those where the high frequencies also contain image detail. For example, a sky, a blurred background, or blank space between frames would contain the characteristics causing those areas to be emphasized. These areas are characterized by lower autocorrelation averaged over a small region. By picking correlations only for high frequencies, and only for areas of the image having the lowest average autocorrelation, the correlation characteristics of the grain can be measured independent of image detail. Because the noise is a constant across the image, a region that contains more high frequencies than elsewhere in the image is more active because of image detail. Also on area of the image containing more middle frequencies contains image detail which probably affects the high frequencies also. In either case such areas should be deemphasized when the goal is to measure only noise without image detail. A simple method of weighting areas inversely proportional to image detail is given in the algorithm on page 16 above. This method simply tests the intensity of higher frequencies, and discounts an area in proportion to that intensity. A second method is described with reference to FIG. 11.

Each pixel in the scanned image is tested to determine whether it may be used for measuring the crosscorrelation. In step 300, a test is performed to determine whether the autocorrelation is below a certain threshold. If the autocorrelation is not below this threshold, the pixel is in an area of high image content and should be discarded. In step 301, the pixel is marked as bad, i.e. it will not be used in the crosscorrelation, and tested, that is, its autocorrelation is evaluated through the threshold test. If the autocorrelation of the pixel is below the threshold, the pixel is marked as "good" and tested in step 303. All the pixels which pass are stored as belonging to area "J" in step 305. An area J may be considered a NxM block where N and M are selectable, 4×4 is a suggested size for many images. In step 307, a test is performed to determine whether there are any untasted pixels adjacent to area "J". If there are untested pixels, these pixels are also tested to determine whether their autocorrelations are below the threshold. If they pass, the pixels are marked as "good"and tested and stored in area "J", if not, they are marked as "bad" and tested. Once there are no contiguous untested pixels to area "J", the process proceeds to step 309 indicating that this area is finished. In step 311, "J" is incremented by one. In step 313, a test is performed to determine whether there are any untasted pixels in other areas of the scanned image. If so, these are tested, other areas are established for use for measuring the crosscorrelations as described above. Once there are no untested pixels, the process ends in step 315.

As mentioned above, the world is not linear, the method as described thus far could provide exact results if the scanner spectral responses were delta functions, like laser scanners. The entry into the cubic root domain provides a useful, yet approximate, method of solving the color crosstalk problem for scanners with broad spectral responses. However, a second embodiment of the invention described below, although much more computationally intensive, can provide more exact results.

A basic idea of the technique is to scan an image storage medium, such as a film, and identify those areas which can be used for the crosscorrolation calculation and to manipulate the spectral responses of either the scanner or the film until the crosscorrelation coefficients are minimized. When the crosscorrelation coefficients are minimized, the value calculated for the dye densities should be close to the actual densities in the film. The new calibrated scanner can be used to produce corrected output from other film images which use the same dyes. In an alternative embodiment, the model of the scanning process can be used to populate an interpolation table used to produce calibrated output from other film materials with the same dyes.

Figure 12:
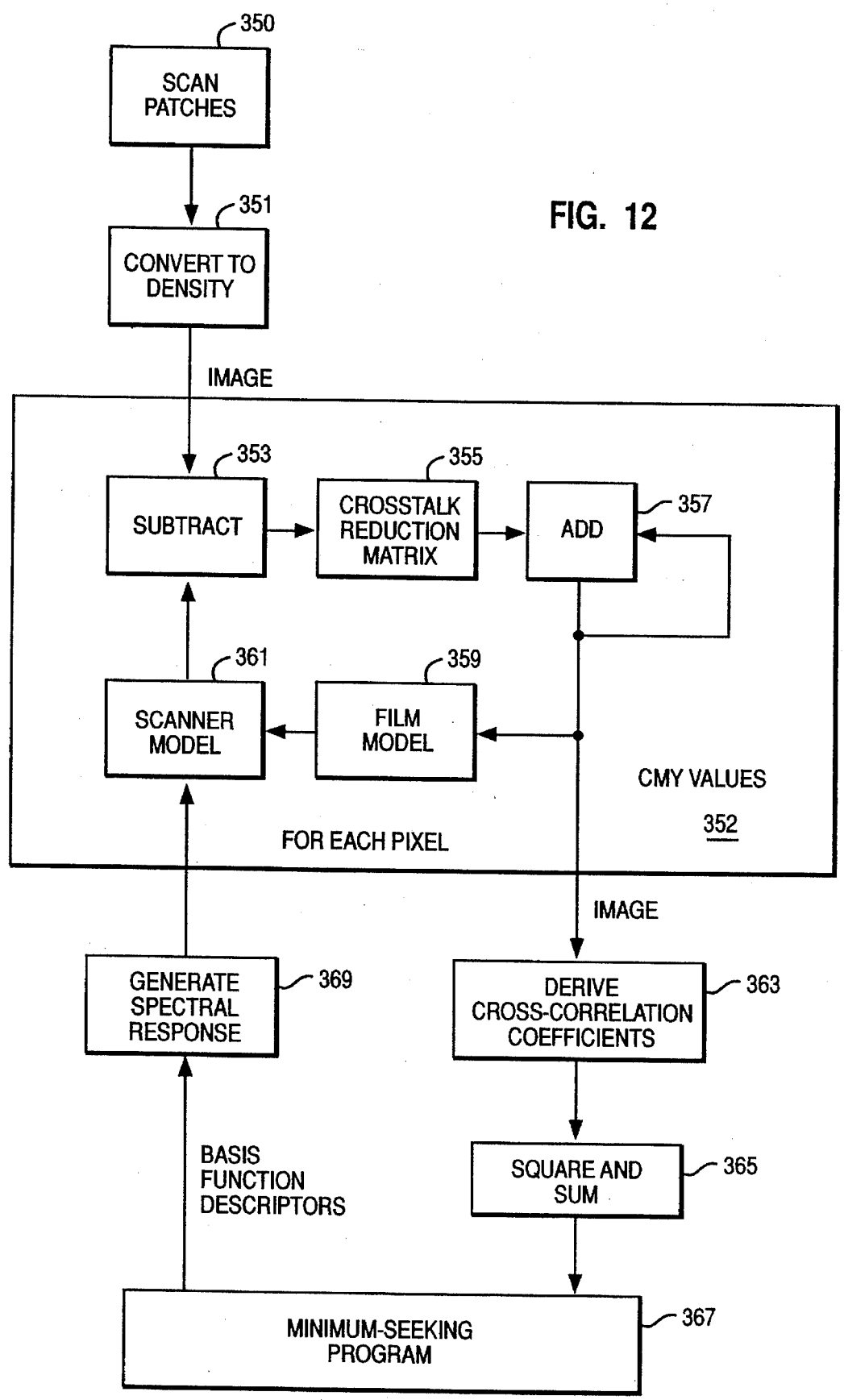
FIG. 12 is a flow diagram of calibrating a scanner, using an iterative technique.

As shown in FIG. 12, the patches identified in the image storage medium are scanned in step 350. The patches should be sufficient in number to keep a false null of the sum of square crosscorrelation coefficients from occurring. It is preferred to have more patches than absolutely necessary, although that can result in some unnecessary computation of the crosscorrelation coefficients. The output of the scanner is converted into density space in step 351, this conversion can be performed by three one-dimensional lookup tables, one for each scanner color plane. A fourth would be added if the invention were to be utilized in the infrared. One means by which these values can be obtained is to scan a step wedge which is nearly linear in density and inverting the values. After the conversion to density space, there is an image of the color patches in scanner coordinates in density space.

Once the image is converted to density in step 353, the measured density $D_R$, $D_G$, $D_B$ for the red, green and blue scans is subtracted from predicted scanner densities $D'_R$, $D'_G$, $D'_B$, for the red, green and blue densities predicted by the scanner model in step 361. As during the first pass there is no prediction, the "error", $E_R$, $E_G$, $E_B$, is the measured density for the red, green and blue scans is fed into the crosstalk reduction matrix.

In step 355, the errors are multiplied by a crosstalk reduction matrix. The inventors have found that a crosstalk reduction matrix can be found empirically by a correct search. The optimum crosstalk reduction matrix for a scanner whose response functions are Gaussians with standard deviations of 15 nanometers, centered at 610, 550, and 450 nanometers, scanning Ektachrome film is:

$$\begin{vmatrix} C \\ M \\ Y \end{vmatrix} = \begin{vmatrix} 1.61 & -0.5 & -0.23 \\ -0.44 & 1.49 & -0.09 \\ 0.05 & -0.27 & 1.3 \end{vmatrix} \times \begin{vmatrix} R \\ G \\ B \end{vmatrix}$$

The crosstalk reduction matrix is not strictly necessary, however, it speeds the conversions of the "errors" to zero.

In step 357, the result of the matrix operation is added to the equations $C'=C'+E_R$, $M'=M'+E_G$, $Y'=Y'+E_B$ where C', M' and Y' are the estimated cyan, magenta and yellow dye densities for this pixel. The estimated dye densities for the pixel are fed to the film modeling step 359, and the crosscorrelation coefficients derivation step 363.

Although many possible film models may be used, a film which obeys Beer's law, the optical density of the film as a function of wavelength is given by the equation:

$$D(\lambda)=YD_y(\lambda)+MD_m(\lambda)+CD_c(\lambda),$$

$D(\lambda)$, is the optical density of the film $D_y(\lambda)$, $D_m(\lambda)$, $D_c(\lambda)$ are the spectral responses of the film dyes and C', M', and Y' are estimated color densities calculated in this iterative process. Density is the log absorption or equivalently negative log transmittance, therefore, the transmittance $T(\lambda)$ is related to the optical density by the equation $T(\lambda)=10^{-D(\lambda)}$.

The transmittance calculation is fed to the scanner modeling step 361. As with the film model, a variety of different scanner models may be used. A complete description would include all the input from light source to electronic RGB output. The output of the scanner can be modeled according to the following equations:

$$D'_R=-\log \int S_R(\lambda)T(\lambda)d\lambda/\int S_R(\lambda)d\lambda$$

$$D'_G=-\log \int S_G(\lambda)T(\lambda)d\lambda/\int S_G(\lambda)d\lambda$$

$$D'_B=-\log \int S_B(\lambda)T(\lambda)d\lambda/\int S_B(\lambda)d\lambda$$

Each channel curve, $D'_R$, $D'_G$ and $D'_B$, represents the product of the spectral responses of source, optics, filter and detection/conversion electronics. $S_R$, $S_G$ and $S_B$ are the spectral responses of the scanner in the red, green and blue channels. In the process depicted in FIG. 13, the spectral responses are generated from the lower loop culminating in step 369.

Once the estimated density values C', M', Y' for each pixel in the film layers are calculated in the upper loop by minimizing the error between the measured and predicted color densities, the value of C', M' and Y' are also passed to step 363, where the crosscorrelation coefficients are derived.

If the calculated "CMY" values are the density of each dye layer on the film, the crosscorrelations coefficients in each patch among the "CMY" values will be zero after their crosscorrelation coefficients of each patch are calculated. The derived crosscorrelation coefficients for the patch are squared and summed in step 365. Step 365 yields a single scalar which serves as a function for the optimum seeking program, step 367, which attempts to minimize the scalar. The optimum seeking program manipulates the vector describing the spectral responses of the scanner to minimize its cost function. One conceptually simple way to model the spectral response is by a 31 entry vector which samples its value every 10 nm. However, this approach would require a 93 dimension search, which would be computationaly intensive. The preferred method would be to model the spectral responses in terms of a set of basis functions whose coefficients have lower dimensionality as described by Marymont and Wandell in "Linear Models of Surface and Illuminate Spectra" Journal of the Optical Society of America, Vol. 9, No. 11, November 1992, pages 1905–1913 which is hereby incorporated by reference. The inventors have found that Gaussian functions provide good models of the spectral responses. The starting point for the spectral responses can be the measured responses of any scanner for which the information is known.

Figure 13:
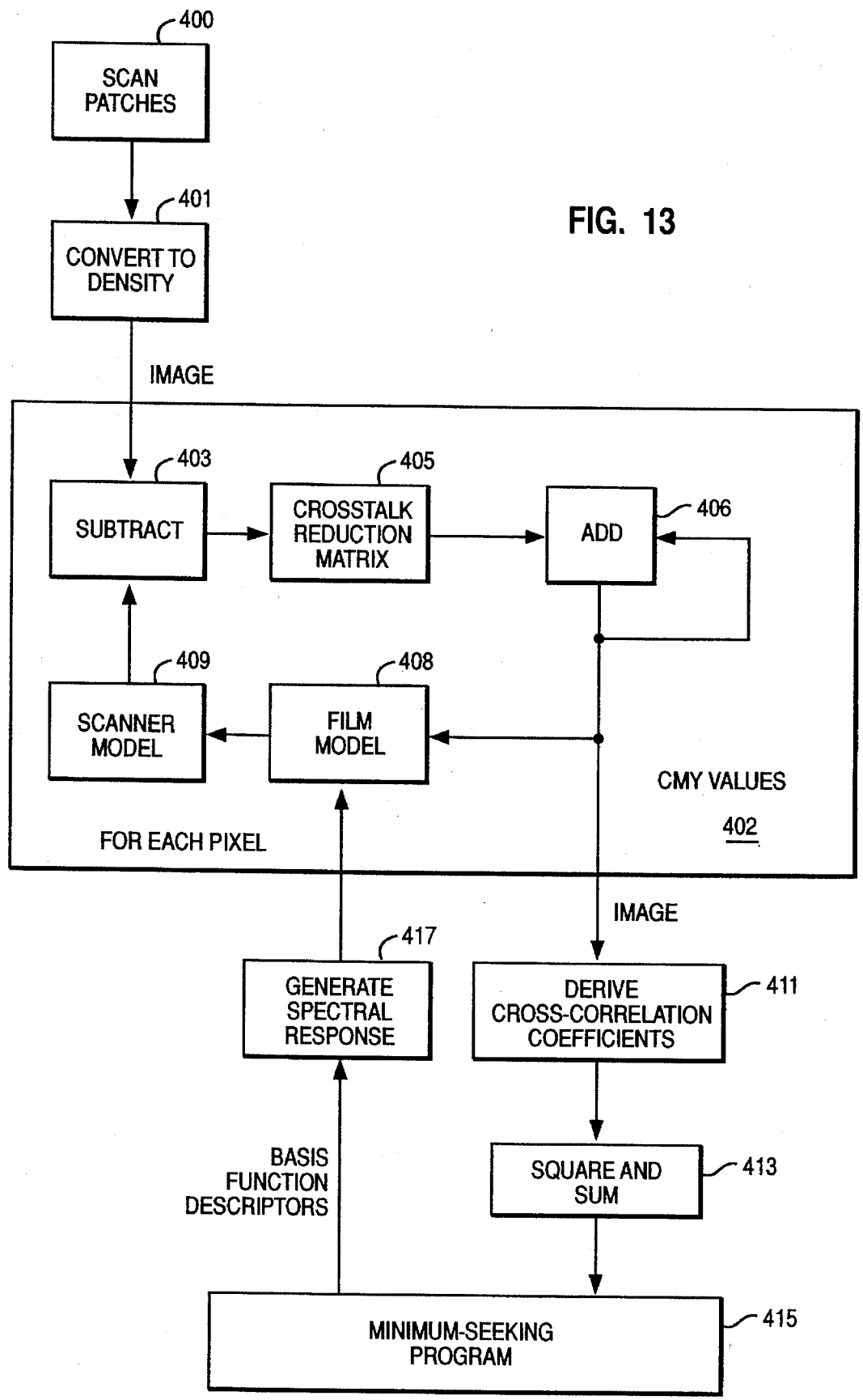
FIG. 13 is a flow diagram of calibrating a scanner when then scanner spectral responses are known and the film spectral responses are not.

The process can be modified for situation for the scanner spectral responses are known and the film spectral responses are not. As depicted in FIG. 13, steps 400, 401, 403, 405, 406, 411 and 413, basically parallel steps 350, 351, 356, 355, 357, 363 and 365 in FIG. 12. In step 408, the spectral responses of the film in the optical density equation according to Beer's law is not known and must be supplied by a minimum seeking program in step 415. In step 417, the spectral responses of the film are generated, rather than the spectral responses of the scanner, as was the case in the process of FIG. 12.

The two techniques can also be combined. Suppose there is a scanner of unknown spectral responses which needs to be calibrated. If there is one film whose spectral response are known, this film can be used in the flow diagram for the process described in the flow diagram of FIG. 12 to determine the scanner spectral responses. Then once the scanner spectral responses are known, the process described in connection with FIG. 13 can be used to calibrate the scanner with respect to additional films even if their spectral responses are unknown. Gaussian functions have also provided a good model for the film spectral responses.

While the scanning process above has been described in terms of models that obey Beer's law, other much more complex models of the scanner process such as Kubelka-Monk may be used. Kubelka-Monk theory is used to model the color of materials which both scatter and absorb light. The theory is being used in the paints, plastic and textile industry for color specification and control and is generally used for translucent and/or opaque media. Thus, the process can be extended to other image storage media besides film such as photographic paper, to the degree that the scanner can resolve the grain of the various dye layers in the paper and distinguish it from the grain of the paper itself.

In addition, there are other ways than basis functions to reduce the dimensionality of the vectors which the optimum seeking program uses to describe the spectral responses. Further, there are a variety of optimum seeking programs.

The method may also be extended to calibrate scanners for printed material using the screens rather than the film grain as an indication of which layer the dye information should be associated with. Specifically, filtering each plane of the separated image with filters designed to detect presence of information at screen angles other than the angle associated with principal component of that plane. Thus, the contribution of information associated with unwanted screen angles can be minimized by an optimum seeking algorithm.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for correcting for the effects of crosscolor crosstalk between colors of a color image stored in an image storage medium and an imaging device used to scan the color image into a plurality of scanned images each corresponding to a color of the color image, comprising the steps of:

identifying noise patterns in the plurality of scanned images;

calculating crosscolor correlations between the identified noise patterns in the plurality of scanned images; and correcting for color crosstalk in each of the scanned images according to the crosscolor correlations.

2. The method as recited in claim 1 wherein the colors comprise ranges for red, blue and green spectra.

3. The method as recited in claim 2 wherein the colors further comprise a range for infrared spectra.

4. The method as recited in claim 1 which further comprises the steps of:

determining a set of autocorrelations between the image and the imaging device in each of the scanned images; and correcting each of the scanned images according to the autocorrelations.

5. The method as recited in claim 1 wherein each of the scanned images corresponds to a layer in a set of layers in the image storage medium.

6. A method for reducing the effects of color crosstalk between a color image and a scanner used to scan the color image, comprising the steps of:

successively scanning the color image with the scanner to produce a set of scanned images of the color image each of which corresponds to a different color;

separating noise patterns from image patterns in the set of scanned images;

calculating crosscolor correlations between the separated noise patterns in pairs of the set of scanned images;

calculating a set of correction coefficients according to the calculated crosscolor correlations; and using the set of correction coefficients to produce a set of adjusted images corrected for color crosstalk from the set of scanned images.

7. The method as recited in claim 6 wherein three of the set of scanned images respectively correspond to a red, a green and a blue scan of the color image, of a cyan, a magenta and a yellow layer in color substrate.

8. The method as recited in claim 7 which further comprises the steps of:

identifying selected areas of the color image which have relatively little signal component other than noise; and calculating crosscolor correlations between noise patterns in the selected areas.

9. The method as recited in claim 7 which further comprises the step of correcting a scanned image according to the set of correction coefficients.

10. The method as recited in claim 7 which further comprises the steps of:

processing color values from the scanned images in an iterative loop which develops a succession of color estimates to determine all amount of each of the different colors in the color image;

processing color values from the scanned images in an iterative loop which develops a succession of crosscorrelation coefficients; and generating a spectral response characterization of the image storage medium according to the crosscorrelation coefficients.

11. The method as recited in claim 6 which further comprises the steps of:

processing color values from the scanned images in an iterative loop which develops a succession of color estimates to determine an amount of each of the different colors in the color image;

processing color values from the scanned images in an iterative loop which develops a succession of crosscorrelation coefficients; and generating a spectral response characterization of the scanner according to the crosscorrelation coefficients.

12. A method for correcting for the effects of crosstalk between images in register with each other, each registered image consisting of a desired pattern and a noise pattern, comprising the steps of;

introducing crosstalk between the registered images to produce adjusted images;

substantial separating a portion of a noise pattern from each adjusted image;

calculating crosscorrelations of the separated noise patterns of the adjusted images; and adjusting the introduced crosstalk so that crosscorrelations between noise patterns of the adjusted images tend toward zero.

13. The method as recited in claim 12 wherein the registered images include the respective red, green, and blue images of a colored image.

14. The method as recited in claim 13 further including an infrared image.

15. The method as recited in claim 12 wherein the separation step further comprises the step of applying a spatial high frequency filter to the image.

16. The method as in claim 15 wherein the separation step further comprises the step of suppressing the desired pattern from inclusion in the noise pattern in regions of the registered images in which the desired pattern is stronger than in other regions of the registered images.

17. The method as recited in claim 16 wherein a strength of the desired pattern in a region is measured as a function of the magnitude of the image remaining in the region after applying a spatial high frequency filter.

18. The method as recited in claim 12 wherein the introducing step further comprised the steps of;

changing the intensity of at least two registered images by selected magnitudes, which may be positive or negative, to produce at least two intensified images; and adding the at least two intensified images together.

19. The method as recited in claim 18 wherein the registered images are first acted on by a function which expands a grayscale range by translating a darkest pixel to pure black and a lightest pixel to pure white to produce a new contrast translation curve before changing pixel intensity.

20. The method of claim 19 wherein the adjusted image is acted on by an inverse function to the function which expands a grayscale range applied to the registered images.

21. The method as recited in claim 18 wherein the selected magnitudes are chosen by an iterative process so that the crosscorrelations tend to zero.

22. The method as recited in claim 12 wherein the registered images are derived from a colored film and wherein the noise pattern is the grain pattern of the colored film.

23. The method as recited in claim 12 wherein the registered images are placed in a computer memory by a scanning process.

24. A system for minimizing crosstalk while scanning at least three images in register with each other on a film substrate, each image consisting of a desired pattern and a grain pattern, comprising:

means for scanning the at least three images into computer memory to produce scanned images, the scanning means introducing undesired crosstalk between the images as they exist on the film substrate into the scanned images;

means for substantially isolating a portion of the grain pattern from the desired pattern in each scanned image, to produce an isolated portion of the grain pattern for each scanned image; and means for adjusting the amount of crosstalk between the scanned images to produce adjusted images such that a proportional adjustment of crosstalk between the isolated portions of the grain patterns would cause the crosscorrelations between the isolated portions of the grain patterns to tend toward zero.

25. A system for correcting for the effects of crosstalk between images in register with each other, each registered image consisting of a respective desired pattern and a respective noise pattern, comprising:

means for introducing crosstalk between the registered images to produce adjusted images;

means for substantially separating a portion of a noise pattern from the adjusted images;

means for calculating crosscorrelations between the separated noise patterns of the adjusted images; and means for adjusting the introduced crosstalk so that crosscorrelations between the separated noise patterns of the adjusted images tend toward zero.

26. A system for correcting for the effects of crosscolor crosstalk between colors of a color image stored in an image storage medium and an imaging device used to scan the color image into a plurality of scanned images each corresponding to a color of the color image, comprising means for identifying noise patterns in the plurality of scanned images;

means for calculating crosscorrelations between the identified noise patterns in pairs of the scanned images; and means for correcting for color crosstalk in each of the scanned images according to the crosscolor correlations between noise patterns.

* * * * *

UNITED STATES PATENT AND TRADEMARK OFFICE
CERTIFICATE OF CORRECTION

PATENT NO. : 5,509,086
DATED : April 16, 1996
INVENTOR(S) : Albert D. Edgar and James M. Kasson It is certified that error appears in the above-indentified patent and that said Letters Patent is hereby corrected as shown below:

Col. 2, line 12, delete "green";

Col. 11, line 18, after "$GB_{3c}$" delete "." and insert --≠--;
Col. 15, line 55, delete "$Y'=Y'=E_B$" insert --$Y'=Y'+E_B$--;
Col. 18, line 34, delete "all" insert --an--; and
line 60, delete "substantial" insert
--substantially--.

Signed and Sealed this

Eighth Day of October, 1996

Attest:

BRUCE LEHMAN

Attesting Officer          Commissioner of Patents and Trademarks